(12) United States Patent
Safai et al.

(10) Patent No.: US 7,567,649 B1
(45) Date of Patent: Jul. 28, 2009

(54) FLEXIBLE DETECTOR FOR X-RAY APPLICATIONS

(75) Inventors: Morteza Safai, Seattle, WA (US); Gary Ernest Georgeson, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/145,852

(22) Filed: Jun. 25, 2008

(51) Int. Cl.
*H05G 1/64* (2006.01)

(52) U.S. Cl. .................. 378/98.8; 250/370.09
(58) Field of Classification Search ............. 378/57, 378/98.8; 250/370.08, 370.09
See application file for complete search history.

(56) References Cited

U.S. PATENT DOCUMENTS

| | | | |
|---|---|---|---|
| 7,050,535 | B2 | 5/2006 | Georgeson et al. |
| 7,231,826 | B2 | 6/2007 | Bossi et al. |
| 7,312,454 | B2 | 12/2007 | Safai et al. |
| 7,313,959 | B2 | 1/2008 | Georgeson et al. |
| 7,315,609 | B2 | 1/2008 | Safai et al. |
| 7,320,249 | B2 | 1/2008 | Georgeson et al. |
| 2003/0031296 | A1* | 2/2003 | Hoheisel .................... 378/98.8 |
| 2007/0116179 | A1* | 5/2007 | Spahn et al. ............... 378/98.8 |
| 2007/0269006 | A1 | 11/2007 | Safai et al. |

OTHER PUBLICATIONS

U.S. Appl. No. 11/923,031, filed Oct. 24, 2007, Safai.
U.S. Appl. No. 11/615,639, filed Dec. 22, 2006, Safai.
U.S. Appl. No. 11/818,871, filed Jun. 15, 2007, Fogarty.
U.S. Appl. No. 11/818,702, filed Jun. 15, 2007, Fogarty.
"Nanoident Fab Prints Semiconductor-based Optoelectronic Sensors", Posted by EDA Geek News Staff in Components on Tuesday, Mar. 13, 2007, pp. 1-2.
"Nanoident claims world's largest printed semiconductor photodetector array", May 22, 2007, http://www.smalltimes.com/articles/article_display.cfm?Section=ARCHI&C=Photo&ARTICLE_ID=293346&p=109 1 page.

* cited by examiner

*Primary Examiner*—Courtney Thomas
(74) *Attorney, Agent, or Firm*—Yee & Associates, P.C.; Dennis R. Plank

(57) ABSTRACT

A method and apparatus for non-destructive examination of structures. In one advantageous embodiment, an apparatus comprises a transmitter and a conformable sensor. The transmitter is capable of transmitting electromagnetic radiation through a first side of a structure. The conformable sensor is capable of detecting the electromagnetic radiation.

20 Claims, 5 Drawing Sheets

FLEXIBLE DETECTOR FOR X-RAY APPLICATIONS

BACKGROUND INFORMATION

1. Field

The present disclosure relates generally to imaging systems and in particular to a method and apparatus for non-destructive examination of structures. Still more particularly, the present disclosure relates to a method and apparatus for identifying anomalies in a structure using a flexible large array organic photodetector.

2. Background

Non-destructive examination involves testing an object without destroying and/or damaging the object. Non-destructive examination may be used in the construction and the maintenance of all types of structures. Non-destructive examination may be employed to identify anomalies in structures such as, for example, without limitation, buildings, dams, aircraft, walls, submarines, wire ropes in suspension bridges, pressure vessels, pipes in industrial plants, underground pipelines, and other suitable structures. This type of testing may be used to identify additional anomalies such as cracking, corrosion, or other anomalies within or on a structure.

Non-destructive examination may be performed using a member of different types of test equipment. For example, ultra-sound systems and x-ray systems may be used to perform non-destructive examination of objects.

With an x-ray system, electromagnetic radiation may be used to produce an image of a structure. This type of image is usually produced to visualize regions below the surface of the structure. An x-ray system may include, for example, an x-ray source, an x-ray detection system, and a positioning system to align the x-ray source and x-ray detection system.

With currently used x-ray systems, the detectors may result in images that contain distortion. For example, a digital silicon based detector is typically flat in configuration. If the structure being tested has a non flat surface, portions of the image can become distorted. Poor detector contact to the part surface under examination will increase geometric unsharpness also referred to as blur, unwanted magnification and image distraction. These changes can be described by equation: MF=SID/SOD, where Source to object distance is (SOD) and source to image receptor distance is (SID).

The distance between portions of the x-ray detector and curved surfaces may change because the detector does not have a shape that is conformable or fitted to the curved surface.

The geometric unsharpness, image distortion, and unwanted magnification of an x-ray image is at the minimum found at the location where the detector is closest to parallel to the part and perpendicular to the x-rays. For example, if the flat detector is used with a pipe, geometric unsharpness in the image is located at the least along a line that goes through the center of the pipe that is perpendicular to the detector. The curvature of the pipe and the flat surface of the x-ray detector are not well-matched.

Therefore, it would be advantageous to have a method and apparatus that overcomes the problems described above.

SUMMARY

The advantageous embodiments provide a method and apparatus for non-destructive examination of structures. In one advantageous embodiment, an apparatus comprises a transmitter and a conformable sensor. The transmitter is capable of transmitting electromagnetic radiation through a first side of a structure. The conformable sensor is capable of detecting the electromagnetic radiation.

In another advantageous embodiment, a non-destructive inspection system comprises a transmitter, an array of conformable organic sensors, and a data processing system connected to the array of conformable organic sensors. The transmitter is capable of transmitting electromagnetic radiation through a first side of a structure. The array of conformable organic sensors is capable of generating data in response to detecting the electromagnetic radiation. The data processing system is capable of storing the data generated by the array of organic conformable sensors to form received data.

In yet another advantageous embodiment, a method for inspecting a structure is present. A conformable sensor is manipulated into an area with respect to the structure, wherein the conformable sensor is capable of detecting electromagnetic radiation. An electromagnetic radiation source is positioned to transmit the electromagnetic radiation through the structure into the area. The electromagnetic radiation from the electromagnetic radiation source is transmitted through the structure into the area. Data is generated from the electromagnetic radiation detected by the conformable sensor.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
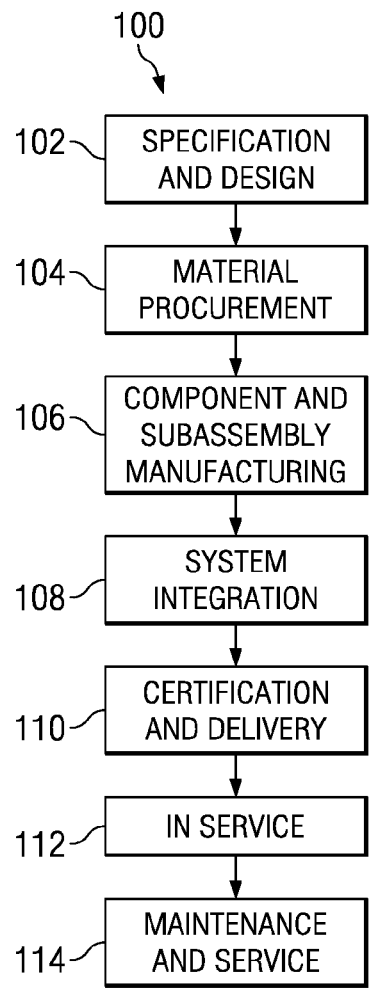
FIG. 1 is a diagram illustrating an aircraft manufacturing and service method in which an advantageous embodiment may be implemented.
Figure 2:
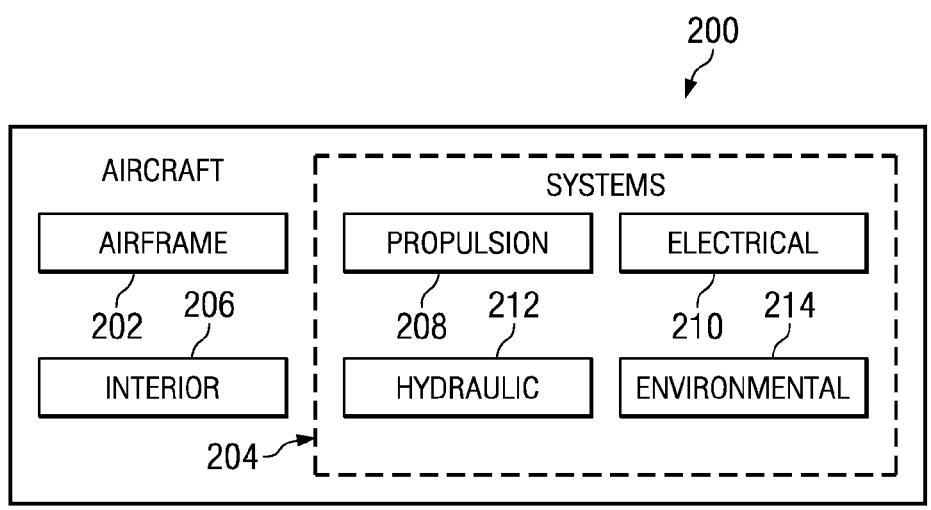
FIG. 2 is a diagram of an aircraft in accordance with an advantageous embodiment.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry. Apparatus and methods embodied herein may be employed during any one or more of the stages of aircraft manufacturing and service method 100 in FIG. 1.

For example, components or subassemblies produced in component and subassembly manufacturing 106 in FIG. 1 may be fabricated or manufactured in a manner similar to components or subassemblies produced while aircraft 200 is in service 112 in FIG. 1. Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

In one illustrative embodiment, a method and apparatus for non-destructive examination may be used during component and subassembly manufacturing 106 in FIG. 1. For example, different structures manufactured and/or assembled during this operation may be examined using non-destructive examination according to the advantageous embodiments. The different advantageous embodiments may speed up and reduce the cost of structures manufactured during subassembly manufacturing. As another example, non-destructive examination of structures may be performed during maintenance and service 114 in FIG. 1.

The different advantageous embodiments may be used to perform non-destructive examination of various parts of aircraft 200 in FIG. 2 during maintenance and service 114 in FIG. 1. For example, non-destructive examination may be performed according to the advantageous embodiments for various parts of aircraft 200 in FIG. 2 such as, for example, airframe 202 in FIG. 2, hydraulic 212 in FIG. 2, and other suitable structures.

The different advantageous embodiments recognize that currently available x-ray detectors may take the form of flat and rigid panels similar to liquid crystal display panels. These types of panels may not provide clear images with respect to structures that have curved surfaces. The different advantageous embodiments recognize that the distance between portions of the x-ray detector and the curved surfaces may change because the detector does not have a shape that is conformable or fitted to the curved surface.

Further, the different advantageous embodiments also recognize that currently available x-ray detectors inspecting various portions of an aircraft may be difficult and/or impossible. The size of currently available x-ray detectors may be difficult to place into limited access areas. These limited access areas include, for example, an interior portion of a wing, an enclosed stiffener, a structural channel, or other substructure.

These types of areas may have sufficient space for the x-ray detector, but a port for access to that area may be too small for currently used x-ray detectors. The different advantageous embodiments recognize that one solution may use x-ray detectors that are small enough to be placed into these areas. The advantageous embodiments recognize that these types of detectors, however, may have limitations because they cover a smaller region, as compared to larger x-ray detectors. As a result, the size of the region that may be tested may not be conductive to structural health monitoring or anomaly growth tracking.

Thus, the different advantageous embodiments provide a method and apparatus for non-destructive examination of structures. In one advantageous embodiment, an apparatus has a transmitter capable of transmitting electromagnetic radiation through a first side of a structure. The apparatus also includes a conformable sensor capable of detecting the electromagnetic radiation.

This conformable sensor may be conformed to be placed into an area with respect to the structure. In these examples, this area may be, for example, an area that has limited access. For example, the area may be a cavity or void within the structure. This area may be accessed through a port in the structure. In these examples, the port may be too small for many conventional x-ray detectors. With a conformable sensor, these types of limitations may be avoided.

Figure 3:
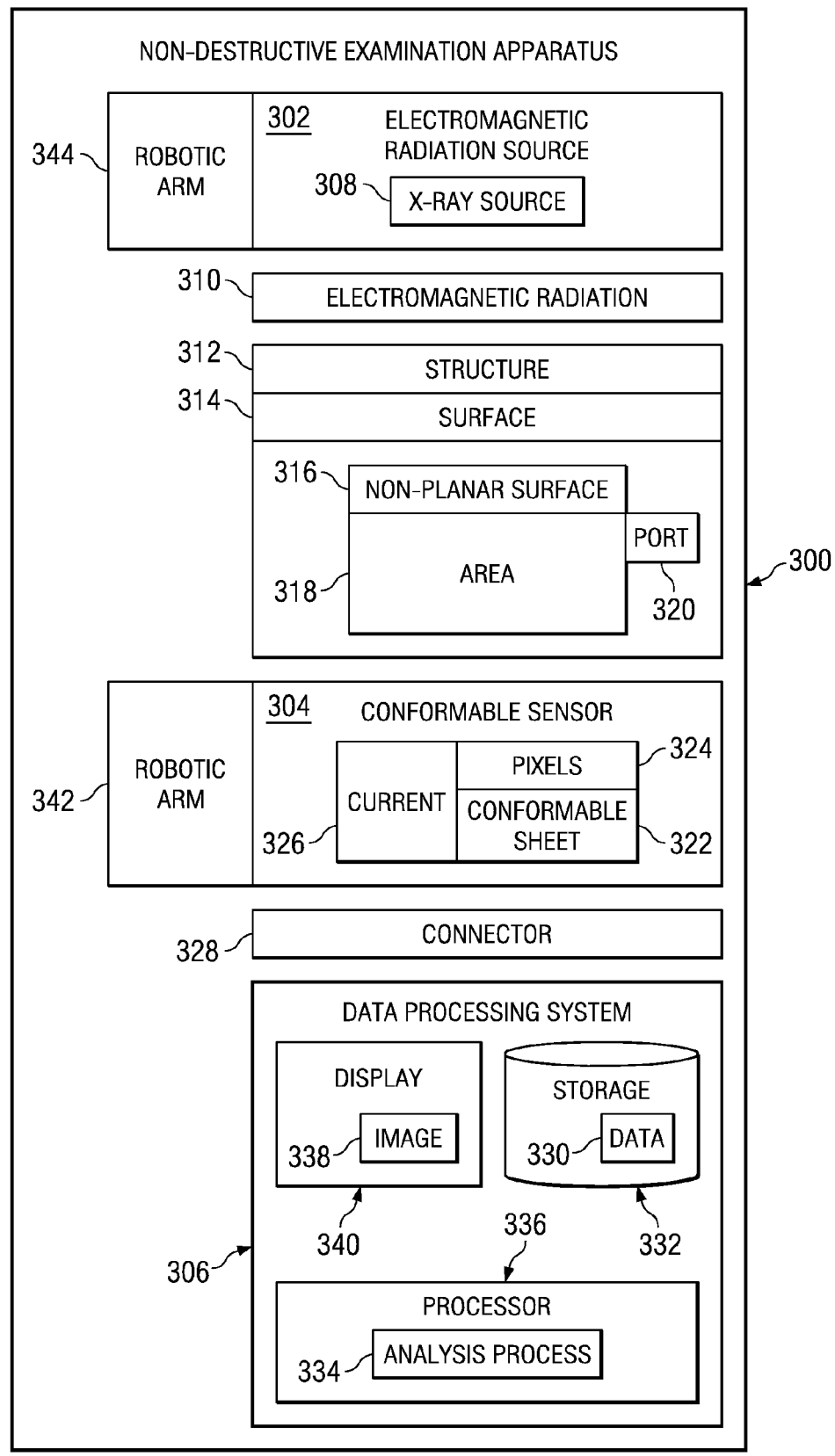
FIG. 3 is a diagram of a non-destructive examination apparatus in accordance with an advantageous embodiment.

With reference now to FIG. 3, a diagram of a non-destructive examination apparatus is depicted in accordance with an advantageous embodiment. In this example, non-destructive examination apparatus 300 is an example of an apparatus that may be used to perform non-destructive examination of objects. In this example, non-destructive examination apparatus 300 includes electromagnetic radiation source 302, conformable sensor 304, and data processing system 306.

Electromagnetic radiation source 302 may be implemented using x-ray source 308. In the different examples, x-ray source 308 may be implemented using any commercially available x-ray source currently used for non-destructive examination or other x-ray imaging applications.

In this example, electromagnetic radiation source 302 may generate electromagnetic radiation 310. Electromagnetic radiation 310 may be directed at structure 312. Electromagnetic radiation 310 may pass through surface 314 of structure 312 and through non-planer surface 316 of structure 312 to be detected by conformable sensor 304.

In this example, non-planer surface 316 may be located generally opposite to surface 314. Non-planer surface 316 may be, for example, a curved surface. In other examples, non-planer surface 316 may be a surface containing grooves, channels, or other irregularities or non-planar features. In some examples, non-planer surface 316 may be located within area 318 inside structure 312. Area 318 may be accessible through port 320. In other advantageous embodiments, non-planer surface 316 may be located on the outside of structure 312 with area 318 being an area located around non-planer surface 316 on the outside of structure 312.

In the different advantageous embodiments, conformable sensor 304 may be capable of being manipulated to be placed through port 320 in structure 312 into area 318 when area 318 is located inside of structure 312. After conformable sensor 304 is placed into area 318, conformable sensor 304 may conform to non-planer surface 316 to detect electromagnetic radiation 310 passing through structure 312.

In this manner, conformable sensor 304 may provide flexibility by being manipulated to be placed within areas in a structure that may otherwise be inaccessible through conventional rigid sensors. Further, conformable sensor 304 also may conform to a surface in area 318 to provide for a clearer and/or improved image as compared to currently available sensors.

In these examples, conformable sensor 304 may be comprised of conformable sheet 322 with pixels 324 formed on or attached to conformable sheet 322. Conformable sheet 322 may be a flexible material or even a completely conformable material, such as a fabric. Conformable sheet 322 may have various shapes. For example, conformable sheet 322 may be, for example, a strip similar to a tape, a rectangle, a square, a pentagon, an octagon, an umbrella like film that may be opened and closed, or some other suitable form or shape. When in the form of an umbrella like film, conformable sheet 322 may include a material attached to a structure that may open and close in a fashion similar to an umbrella.

Pixels 324 may be an array of sensors that is capable of detecting electromagnetic radiation 310. An array may have one or more elements. In these examples, a pixel within pixels 324 may become conductive and allow a current to flow when electromagnetic radiation 310 is detected.

Pixels 324 may take the form of transistors such as, for example, thin film transistors. These thin film transistors may have a PN junction in which electrons may be freed when electromagnetic radiation 310 is absorbed by the transistor. Of course, other types of pixels or conformable sheets may be used to implement conformable sensor 304, depending on the particular implementation. In these examples, the transistors may be organic thin film transistors similar to those used in organic light emitting diode devices.

In these examples, pixels 324 may generate current 326 which is detected by data processing system 306. Data processing system 306 may be connected to conformable sensor 304 through connector 328. Connector 328 may take various forms. For example, connector 328 may be a cable or some other physical link. In other advantageous embodiments, connector 328 may be a wireless communications link between conformable sensor 304 and data processing system 306.

In these examples, data processing system 306 may take various forms. For example, data processing system 306 may be, for example, a computer or some other device capable of detecting current 326 and generating or collecting data 330. Current 326 may be used to generate data 330, which may be stored within storage 332 in data processing system 306. Storage 332 may be any type of device capable of storing data 330. For example, storage 332 may be, for example, a random access memory, a non-volatile memory, a hard disk, a floppy disk, an optical disk, or some other suitable storage device.

Data 330 may be analyzed using analysis process 334 executed by processor 336 to determine whether anomalies are present within structure 312. Further, analysis process 334 also may generate image 338 for presentation on display 340.

In this manner, the different advantageous embodiments may provide a capability to obtain desired images in areas within a structure having limited access. Further, with the ability to be conformed to fit within port 320 into area 318, conformable sensor 304 may have a size that is larger than a small ridged detector that may fit through port 320.

Additionally, the different advantageous embodiments also provide a capability for improving image quality through the use of conformable sensor 304. By conforming or manipulating conformable sensor 304 to conform to or have a configuration similar to non-planer surface 316, an improved image may be obtained as compared to currently available sensor systems. The manipulation may include, for example, unrolling, unfurling, unfolding, opening in an umbrella like film, conforming pieces to a part, or other suitable actions.

Non-destructive examination apparatus 300 also may include robotic arm 342 to move and manipulate conformable sensor 304 into the appropriate location or limited access area. In other embodiments, electromagnetic radiation source 302 also may be located on robotic arm 344. With this type of implementation, robotic arm 342 and robotic arm 344 may be controlled by data processing system 306. With this type of implementation, analysis process 334 may include processes to control and manipulate robotic arm 342 and robotic arm 344.

The illustration of non-destructive examination apparatus 300 in FIG. 3 is presented for purposes of illustrating different functional components that may be found in a non-destructive examination apparatus. This illustration is not meant to imply architectural or physical limitations to the manner in which this type of apparatus may be implemented. For example, components in addition to or in place of the ones illustrated may be used depending on the particular implementation.

As an example, in some advantageous embodiments, multiple conformable sensors, such as conformable sensor 304, may be found in non-destructive examination apparatus 300. In yet other advantageous embodiments, data processing system 306 may not be included as part of non-destructive examination apparatus 300.

Current 326 generated by conformable sensor 304 may be sent to a device connected to non-destructive examination apparatus 300. In yet other advantageous embodiments, conformable sensor 304 may generate data 330 and send that data to data processing system 306 rather than having data processing system 306 detect current 326 to generate data 330.

Figure 4:
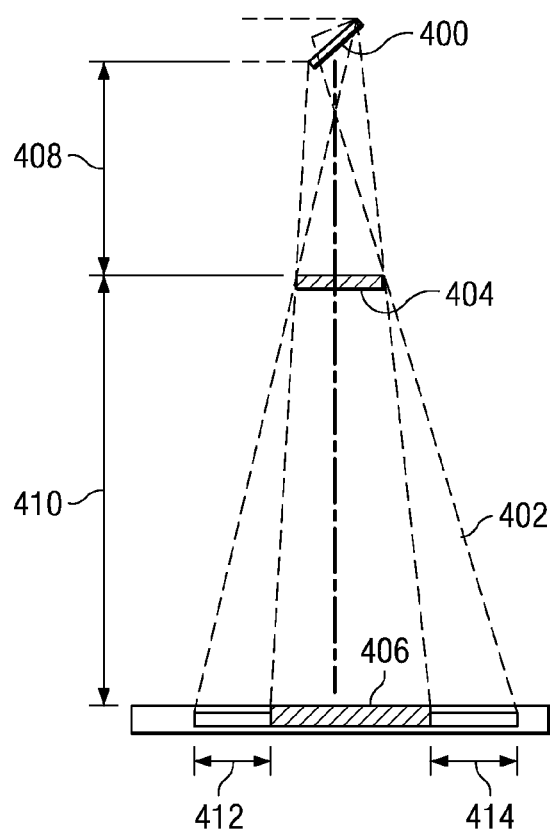
FIG. 4 is a diagram illustrating geometric unsharpness in accordance with an advantageous embodiment.

With reference now to FIG. 4, a diagram illustrating geometric unsharpness is illustrated in accordance with an advantageous embodiment. In this example, x-ray source 400 may send beam 402 through object 404 to detector 406. Source to object distance 408 is the distance from x-ray source 400 to object 404. Image to object distance 410 is the distance from object 404 to detector 406. In this example, area of unsharpness 412 and area of unsharpness 414 are areas of unsharpness that may occur. The unsharpness occurs when off angle x-ray photons in beam 402 from source 400 are blocked by the object geometry in object 404. Unsharpness also occurs if the x-ray photons in beam 402 are partially blocked by object geometry in object 404. This effect can be controlled by using an x-ray tube with smaller filaments in source 400, reducing the distance of detector 400 to the object, or by reducing the distance of detector 406 to object 404.

Figure 5:
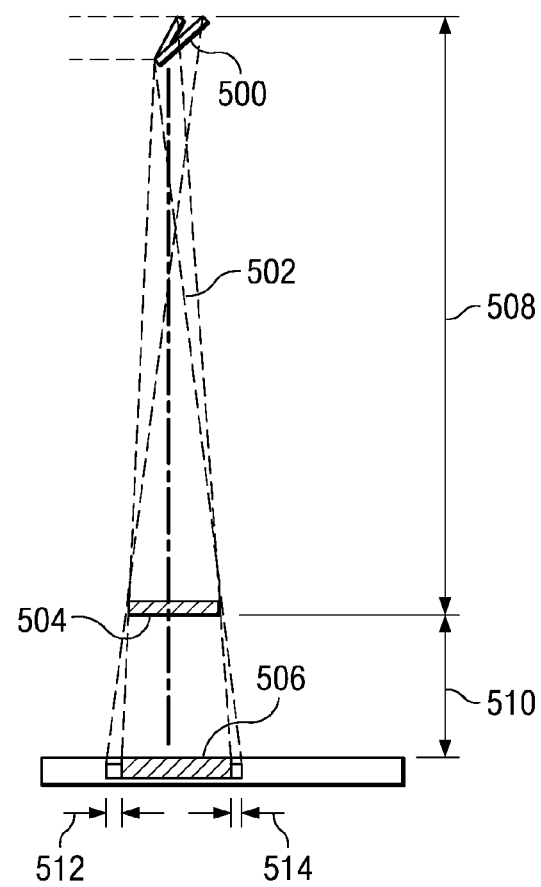
FIG. 5 is another diagram illustrating geometric unsharpness in accordance with an advantageous embodiment.

With reference now to FIG. 5, another diagram illustrating geometric unsharpness is depicted in accordance with an advantageous embodiment. In this example, x-ray source 500 may transmit beam 502 through object 504 to detector 506. In this example, source to detector distance 508 and image to detector distance 510 are present. In this example, detector 506 has a smaller value for image to detector distance 510 and a larger value for source to detector distance 508 as compared to the example in FIG. 4.

As can be seen, in this example, area of unsharpness 512 and area of unsharpness 514 are smaller as compared to area of unsharpness 412 and area of unsharpness 414 in FIG. 4. This example has reduced image unsharpness, reduced image distortion, and may eliminate unwanted magnification. The geometric unsharpness, in these examples, is equal to a focal spot size multiplied by the image to detector distance and divided by the source to detector distance.

Figure 6:
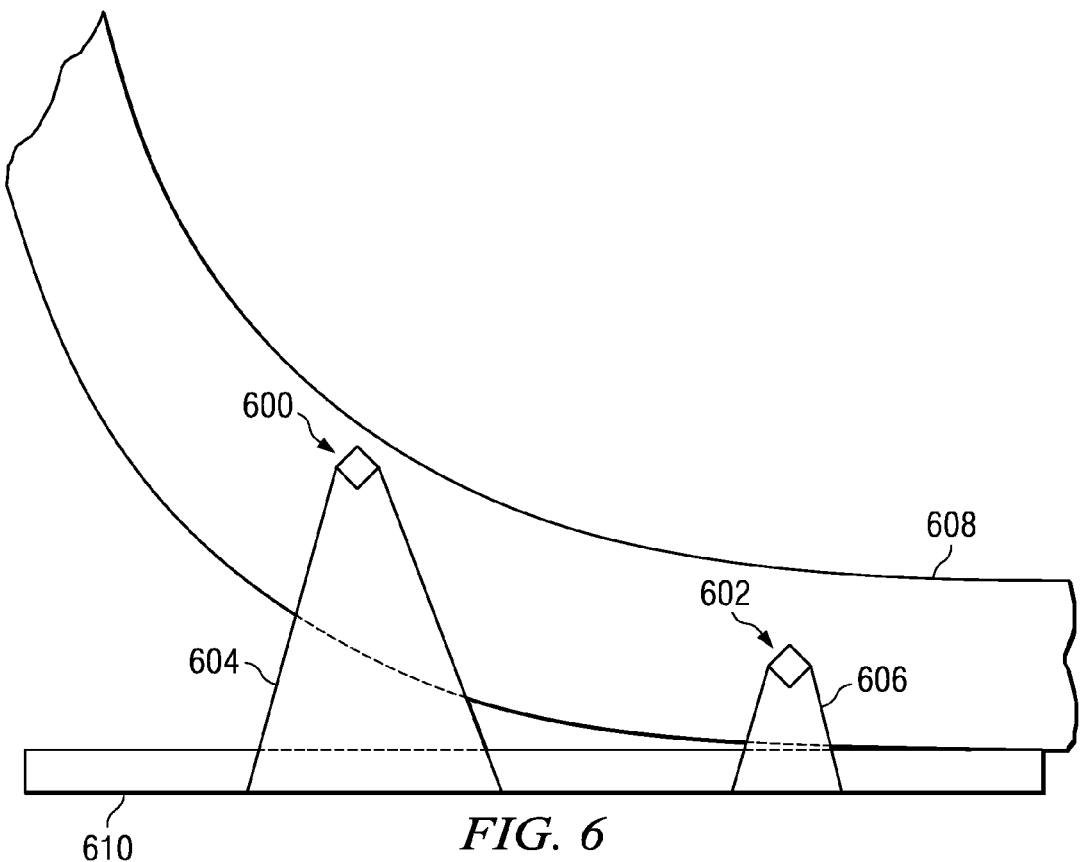
FIG. 6 is a diagram illustrating changes in unsharpness in accordance with an advantageous embodiment.

With reference now to FIG. 6, a diagram illustrating changes in unsharpness is depicted in accordance with an advantageous embodiment. In this example, x-ray 600 and x-ray 602 may be from an x-ray beam. X-ray 600 generates emission 604, while x-ray 602 generates emission 606 when passing through object 608 for detection by detector 610. In this example, emission 604 has an area of unsharpness similar to the example in FIG. 4, while emission 606 has an area of unsharpness similar to the example in FIG. 5.

The different embodiments recognize that this difference in the area of unsharpness, image to detector distance, and source to detector distance may change the unsharpness. As a result, with less contact to detector 610 by object 608, the unsharpness, image distortion and magnification increases as shown. The different advantageous embodiments take this problem into account in non-destructive examination apparatus 300 in FIG. 3.

Figure 7:
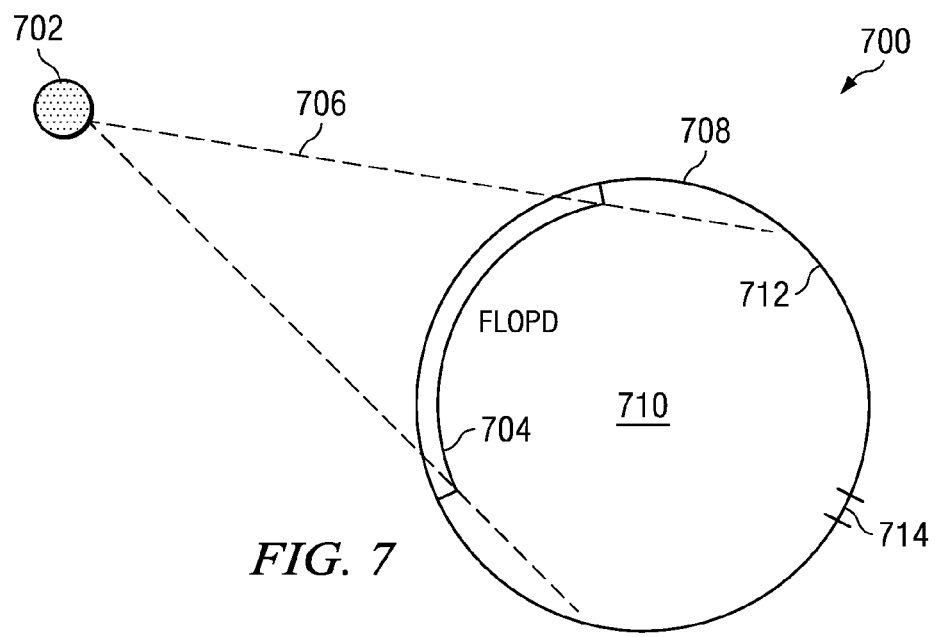
FIG. 7 is a diagram illustrating an inspection of a tube-like structure in accordance with an advantageous embodiment.

With reference now to FIG. 7, a diagram illustrating an inspection of a tube-like structure is depicted in accordance with an advantageous embodiment. In this example, structure 700 takes the form of a tube-like structure and is one example of structure 312 in FIG. 3. For example, structure 700 may be, for example, a pipe or tube. This pipe or tube may be found in other structures such as, for example, an aircraft or an underground pipe system.

In this example, x-ray source 702 and conformable sensor 704 may be components in a non-destructive examination apparatus, such as non-destructive examination apparatus 300 in FIG. 3.

As illustrated x-ray source 702 is an example of x-ray source 308 in FIG. 3. Conformable sensor 704 is an example of conformable sensor 304 in FIG. 3. As illustrated, x-ray source 702 may emit electromagnetic radiation in the form of beam 706 through surface 708 of structure 700 into interior area 710 of structure 700.

Conformable sensor 704 is located in interior area 710. Conformable sensor 704 is manipulated to follow inner surface 712 of interior area 710. In this manner, conformable sensor 704 may receive electromagnetic radiation in beam 706. Further, conformable sensor 704 may conform to the shape of inner surface 712. This conformance to inner surface 712 may provide a clearer image as compared to a flat rigid sensor that may be placed inside interior area 710.

An image generated from detecting beam 706 is undistorted at the location where conformable sensor 704 is oriented parallel to structure 700 and perpendicular to the x-rays in beam 706. Conformable sensor 704 can conform to the structure. In this manner, the geometric unsharpness of an image may be reduced wherever surface 708 of structure 700 is not perpendicular to the x-rays.

Further, in some implementations, access to interior area 710 may prevent a rigid sensor having around the same size as conformable sensor 704 from being placed into interior area 710. In this example, conformable sensor 704 may be manipulated to be placed into interior area 710. For example, conformable sensor 704 may be folded, rolled, or manipulated in some other fashion to fit through a portal, such as portal 714. In this example, portal 714 may be sized such that conformable sensor 704 may not fit into interior area 710 without being manipulated to change the shape or configuration of conformable sensor 704 to fit through portal 714.

Figure 8:
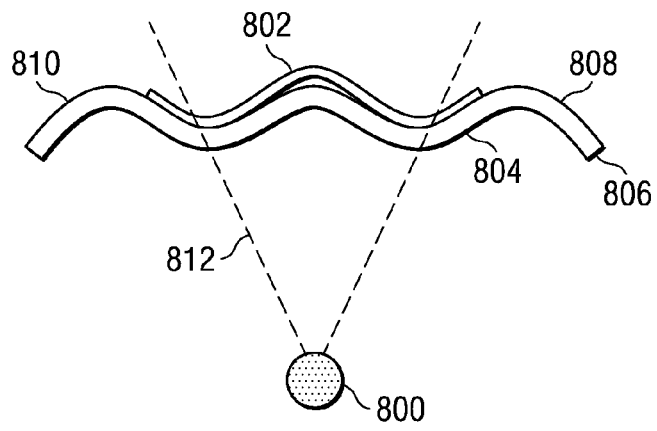
FIG. 8 is a diagram illustrating an example of an inspection of a structure in accordance with an advantageous embodiment.

With reference now to FIG. 8, a diagram illustrating an example of an inspection of a structure is depicted in accordance with an advantageous embodiment. As illustrated, x-ray source 800 and conformable sensor 802 may be components in an apparatus, such as non-destructive examination apparatus 300 in FIG. 3.

In this example, x-ray source 800 is located on side 804 of structure 806 with conformable sensor 802 being on side 808 of structure 806. As illustrated, conformable sensor 802 may by manipulated to conform to non-planer surface 810 on side 808.

X-ray source 800 may emit electromagnetic radiation in the form of beam 812 through structure 806 with this electromagnetic radiation being detected by conformable sensor 802.

The illustration of the different examples of non-destructive examination in FIGS. 7 and 8 are presented for purposes of illustrating some applications for non-destructive examination and are not meant to limit the manner in which advantageous embodiments may be applied to examine structures. Structures of other shapes and sizes, in addition to those illustrated, may be examined using the different advantageous embodiments.

Figure 9:
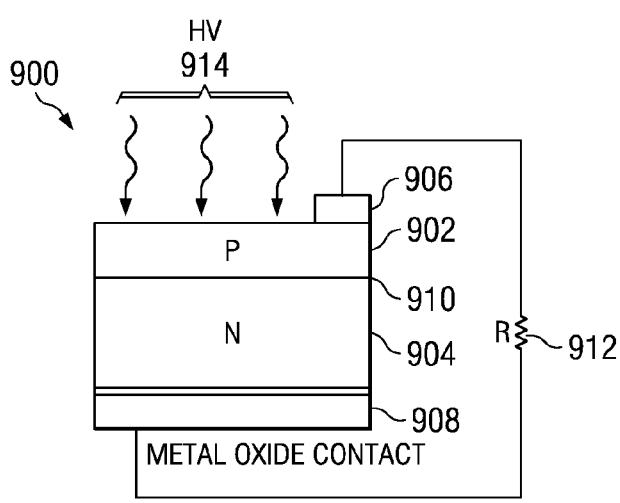
FIG. 9 is a diagram illustrating a pixel in accordance with an advantageous embodiment.

With reference now to FIG. 9, a diagram illustrating a pixel is depicted in accordance with an advantageous embodiment. In this example, pixel 900 is an example of a sensor within pixels 324 in FIG. 3. As illustrated, pixel 900 may include P-type region 902, N-type region 904, anode 906, cathode 908, and PN junction 910. Cathode 908 may be connected to anode 906 through resistor 912.

In these examples, electromagnetic radiation 914 may cause electrons to flow within PN junction 910, allowing current to flow through pixel 900 between anode 906 and cathode 908.

This structure may be implemented using various devices. For example, without limitation, the structure for pixel 900 may be implemented using a transistor. In particular, a thin film transistor may be used to implement pixel 900. When using thin film transistors, these transistors may be at least one of an amorphous silicone transistor and an organic thin film transistor.

As used herein, the phrase "at least one of", when used with a list of items, means that different combinations one or more of the items may be used and only one of each item in the list may be needed. For example, "at least one of item A, item B, and item C" may include, for example, without limitation, item A, or item A and item B. This example also may include item A, item B, and item C, or item B and item C.

With the use of organic thin film transistors, an array of pixels may be formed on a conformable sheet or some other material that may be manipulated in a desired manner. Pixel 900 may be formed using a glass based active matrix organic PN junction or a polysilicon material on some type of back-plane such as flexible polymeric material. In these examples, the back plane is the substrate which may provide flexibility. In some advantageous embodiments, thin film transistors may be formed on flexible polymeric substrates to form pixels, such as pixel 900.

FIG. 9 is presented for illustrating one manner in which a pixel may be implemented in a conformable sensor. This illustration is not meant to imply limitations on the manner in which a pixel may be implemented. In the advantageous embodiments, a pixel may be any element or device that is capable of generating a signal in response to detecting electromagnetic radiation, such as an x-ray.

Figure 10:
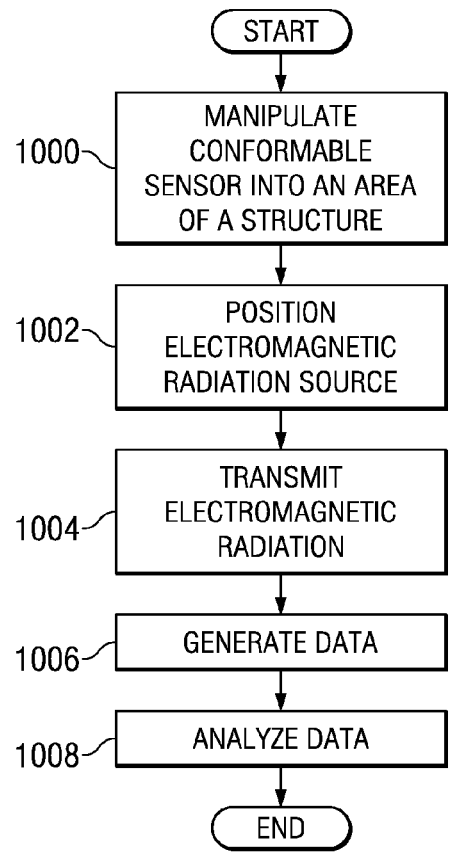
FIG. 10 is a flowchart of a process for performing non-destructive examination in accordance with an advantageous embodiment.

With reference now to FIG. 10, a flowchart of a process for performing non-destructive examination is depicted in accordance with an advantageous embodiment. The process illustrated in FIG. 10 may be implemented using a device, such as non-destructive examination apparatus 300 in FIG. 3.

The process begins by manipulating a conformable sensor into an area of a structure (operation 1000). This area may be on one side of the structure or inside of the structure, depending on the particular structure being examined. If placed into a structure, the manipulation may include passing the conformable sensor through a port into an interior portion of the structure. This manipulation may include folding, unfolding, rolling up, unrolling, opening an umbrella like film, closing an umbrella like film, or performing some other action to position the conformable sensor to perform the non-destructive examination.

The process positions an electromagnetic radiation source to direct or emit a beam of electromagnetic radiation through the structure in a manner that can be detected by the conformable sensor (operation 1002). The process transmits electromagnetic radiation (operation 1004). The process then generates data (operation 1006). This data may be generated by the conformable sensor in response to detecting the electromagnetic radiation.

The conformable sensor may generate data in the form of signals to indicate that electromagnetic radiation has been detected. The signal may be a set of electrical signals from an array of pixels as described above. The set of signals may be raw data or preprocessed data, depending on the implementation.

For example, the data may be generated based on detecting currents from pixels within the conformable sensor. The amount of current flowing through a pixel may be used to identify an intensity for a particular pixel. Of course, other schemes may be used depending on the particular implementation.

The data may then be analyzed (operation 1008), with the process terminating thereafter. This analysis may include a determination as to whether the data indicates that anomalies are present in the structure. This analysis also may include presenting an image of the structure.

Although the different operations are illustrated in a particular order, different operations may be performed in different orders, depending on the particular implementation. Further, different operations may be included or eliminated depending on other implementations. For example, the electromagnetic radiation source may be positioned in operation 1002 prior to manipulating the conformable sensor into the area of the structure in operation 1000. Further, operations 1002, 1004, and 1006 may be repeated to generate data for different areas of the structure being tested.

Thus, the different advantageous embodiments provide a method and apparatus for performing a non-destructive examination. In the different examples, the apparatus may include a transmitter capable of transmitting electromagnetic radiation through a first side of a structure. This apparatus also may include a conformable sensor capable of detecting the electromagnetic radiation. This conformable sensor may be located on an opposite side of the transmitter.

Thus, the different advantageous embodiments may provide a capability to perform a non-destructive examination in a number of different environments. In the different examples, the structure may be one for an aircraft. In other advantageous embodiments, non-destructive examination apparatus 300 in FIG. 3 may be used in surgical non-destructive examinations.

With this type of implementation, conformable sensor 304 in FIG. 3 may take the form of an umbrella expandable sensor which may be inserted into small holes. Further, the non-destructive examination apparatus in the different advantageous embodiments may be used for limited access areas, as well as remote access areas.

The description of the different advantageous embodiments has been presented for purposes of illustration and description, and is not intended to be exhaustive or limited to the embodiments in the form disclosed. Many modifications and variations will be apparent to those of ordinary skill in the art.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
 a transmitter capable of transmitting electromagnetic radiation through a first side of a structure; and
 a conformable sensor configured to detect the electromagnetic radiation and conformed to be inserted through a port in the structure into an area inside of the structure.

2. The apparatus of claim 1, further comprising:
 a data processing system connected to the conformable sensor, wherein the data processing system is configured to detect image data generated by the conformable sensor in response to detecting the electromagnetic radiation.

3. The apparatus of claim 1, wherein the conformable sensor comprises:
 a flexible organic detector configured to detect the electromagnetic radiation.

4. The apparatus of claim 3, wherein the flexible organic detector comprises:
 a conformable material; and
 a plurality of organic transistors formed on the conformable material, wherein the plurality of organic transistors is configured to detect the electromagnetic radiation.

5. The apparatus of claim 1, wherein the conformable sensor comprises a conformable sheet having a plurality of sensor units configured to detect the electromagnetic radiation.

6. The apparatus of claim 5, wherein the plurality of sensor units is a plurality of pixels configured to detect the electromagnetic radiation.

7. The apparatus of claim 5, wherein the conformable sheet comprises a fabric.

8. The apparatus of claim 5, wherein a sensor unit in the plurality of sensor units comprises:
 a p-type region;
 an n-type region; and a pn junction located between the p-type region and the n-type region, wherein the electromagnetic radiation causes the sensor unit to conduct a current.

9. The apparatus of claim 5, wherein the plurality of sensor units comprises:
a plurality of thin film transistors.

10. The apparatus of claim 9, wherein the plurality of thin film transistors comprises at least one of a set of amorphous silicon thin film transistors and a set of organic thin film transistors.

11. The apparatus of claim 1, wherein the conformable sensor is configured to conform to a non-planar surface of the structure such that a substantially uniform distance is present between the conformable sensor and a surface of the structure.

12. A non-destructive inspection system comprising:
a transmitter configured to transmit electromagnetic radiation through a first side of a structure;
an array of conformable organic sensors configured to generate data in response to detecting the electromagnetic radiation and conformed to be inserted through a port in the structure into an area inside of the structure; and
a data processing system connected to the array of conformable organic sensors, wherein the data processing system is configured to store the data generated by the array of conformable organic sensors to form received data.

13. The non-destructive inspection system of claim 12, wherein the data processing system is configured to generate an image from the received data and displaying the image.

14. The non-destructive inspection system of claim 13, wherein the data processing system is configured to analyze the received data to determine whether an anomaly is present in the structure.

15. A method for inspecting a structure, the method comprising:
inserting a conformable sensor through a port in the structure into an area inside of the structure, wherein the conformable sensor is configured to detect electromagnetic radiation;
positioning an electromagnetic radiation source to transmit the electromagnetic radiation through the structure into the area;
transmitting the electromagnetic radiation from the electromagnetic radiation source through the structure into the area; and
generating data from the electromagnetic radiation detected by the conformable sensor.

16. The method of claim 15, wherein the generating step comprises:
measuring levels of the electromagnetic radiation detected by different portions of the conformable sensor to generate the data.

17. The method of claim 15, further comprising:
generating an image from the data.

18. The method of claim 15, further comprising:
analyzing the data to determine whether anomalies are present in the structure.

19. The method of claim 15, wherein the conformable sensor comprises:
a conformable sheet having a plurality of sensor units configured to detect the electromagnetic radiation.

20. The method of claim 19, wherein the plurality of sensor units are a plurality of pixels configured to detect the electromagnetic radiation.

* * * * *